United States Patent
Ramaswamy et al.

(10) Patent No.: US 9,627,684 B2
(45) Date of Patent: Apr. 18, 2017

(54) HIGH CAPACITY, DIMENSIONALLY STABLE ANODE FROM LOW-BULK DENSITY AMORPHOUS SILICON FOR LITHIUM-ION BATTERIES

(71) Applicant: Nissan North America, Inc., Franklin, TN (US)

(72) Inventors: Nagappan Ramaswamy, Farmington Hills, MI (US); Peter Aurora, Ann Arbor, MI (US); Taehee Han, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 415 days.

(21) Appl. No.: 14/180,571

(22) Filed: Feb. 14, 2014

(65) Prior Publication Data

US 2015/0236344 A1    Aug. 20, 2015

(51) Int. Cl.
| | | |
|---|---|---|
| *H01M 4/38* | (2006.01) | |
| *C01B 33/02* | (2006.01) | |
| *H01M 4/04* | (2006.01) | |
| *H01M 4/134* | (2010.01) | |
| *H01M 4/1395* | (2010.01) | |
| *H01M 10/052* | (2010.01) | |
| *H01M 4/02* | (2006.01) | |

(52) U.S. Cl.
CPC ............ *H01M 4/386* (2013.01); *C01B 33/02* (2013.01); *H01M 4/0404* (2013.01); *H01M 4/0471* (2013.01); *H01M 4/134* (2013.01); *H01M 4/1395* (2013.01); *H01M 10/052* (2013.01); *H01M 2004/021* (2013.01); *H01M 2004/027* (2013.01)

(58) Field of Classification Search
CPC ............ H01M 10/0525; H01M 4/525; H01M 10/052; H01M 4/485; H01M 2004/021; H01M 4/366; H01M 10/0587; H01M 2004/027; H01M 4/131; H01M 4/661; H01M 4/134; H01M 2/0275; H01M 2/266; H01M 4/663
See application file for complete search history.

(56) References Cited

U.S. PATENT DOCUMENTS

| | | | |
|---|---|---|---|
| 2007/0204457 A1* | 9/2007 | Sato | H01M 4/13 29/623.1 |
| 2012/0231326 A1 | 9/2012 | Biswal et al. | |
| 2013/0295454 A1* | 11/2013 | Huang | H01M 4/386 429/211 |
| 2015/0099187 A1* | 4/2015 | Cui | H01M 4/134 429/231.8 |

* cited by examiner

*Primary Examiner* — Lucas J. O'Donnell
(74) *Attorney, Agent, or Firm* — Young Basile Hanlon & MacFarlane, P.C.

(57) ABSTRACT

An anode active material for a lithium-ion battery cell comprises low density silicon. The anode active material is provided in an anode for a lithium-ion battery. Also disclosed are methods of making the anode active material.

11 Claims, 3 Drawing Sheets

| Electrode | Total Thickness (μm) | Porosity (%) | Density (g/cm$^3$) |
|---|---|---|---|
| c-Si (Alfa) Pressed | 31 | 48 | 1.1 |
| a-Si (Pressed) | 33 | 71 | 0.7 |
| a-Si (Not Pressed) | 42 | 80 | 0.5 |

HIGH CAPACITY, DIMENSIONALLY STABLE ANODE FROM LOW-BULK DENSITY AMORPHOUS SILICON FOR LITHIUM-ION BATTERIES

TECHNICAL FIELD

This disclosure relates to an anode of a lithium-ion battery formed from low-bulk density amorphous silicon.

BACKGROUND

Hybrid vehicles (HEV) and electric vehicles (EV) use chargeable-dischargeable power sources. Secondary batteries such as lithium-ion batteries are typical power sources for HEV and EV vehicles. Lithium-ion secondary batteries typically use carbon, such as graphite, as the anode electrode. Graphite materials are very stable and exhibit good cycle-life and durability. However, graphite material suffers from a low theoretical lithium storage capacity of only about 372 mAh/g. This low storage capacity results in poor energy density of the lithium-ion battery and low electric mileage per charge.

SUMMARY

An anode active material for a lithium-ion battery cell comprising low density silicon is disclosed, as well as an anode and lithium-ion battery having the anode active material. Also disclosed are methods of making the anode active material. One method comprises preparing a solution of low density silicon, a conductive material and a binder and coating an electrode substrate with the solution to form the anode. The anode is pre-dried without pressing the anode to preserve inter-particle porosity. Active material loading of the low density silicon in the anode is tested. If the active material loading is within a target loading range, then the anode is calcinated and dried without pressing. If the active material loading is not within the target loading range, then the active material loading of the solution on the electrode substrate is adjusted and re-tested.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures.

DETAILED DESCRIPTION

Because the carbon material used in anodes of conventional lithium-ion batteries suffers from a low specific capacity, the conventional lithium-ion battery has poor energy density and low electric mileage per charge. To increase the energy density of lithium-ion batteries, alternative anode active materials with high lithium storage capacities are required.

Silicon based anode active materials have potential as a replacement for the carbon material of conventional lithium-ion battery anodes due to silicon's high theoretical lithium storage capacity of 3500 to 4400 mAh/g. Such a high theoretical storage capacity could significantly enhance the energy density of the lithium-ion batteries. However, silicon active materials suffer from rapid capacity fade, poor cycle life and poor durability. One primary cause of this rapid capacity fade is the massive volume expansion of silicon (typically up to 300%) upon lithium insertion. Volume expansion of silicon causes particle cracking and pulverization. This deteriorative phenomenon escalates to the electrode level, leading to electrode delamination, loss of porosity, electrical isolation of the active material, increase in electrode thickness, rapid capacity fade and ultimate cell failure.

Figure 1:
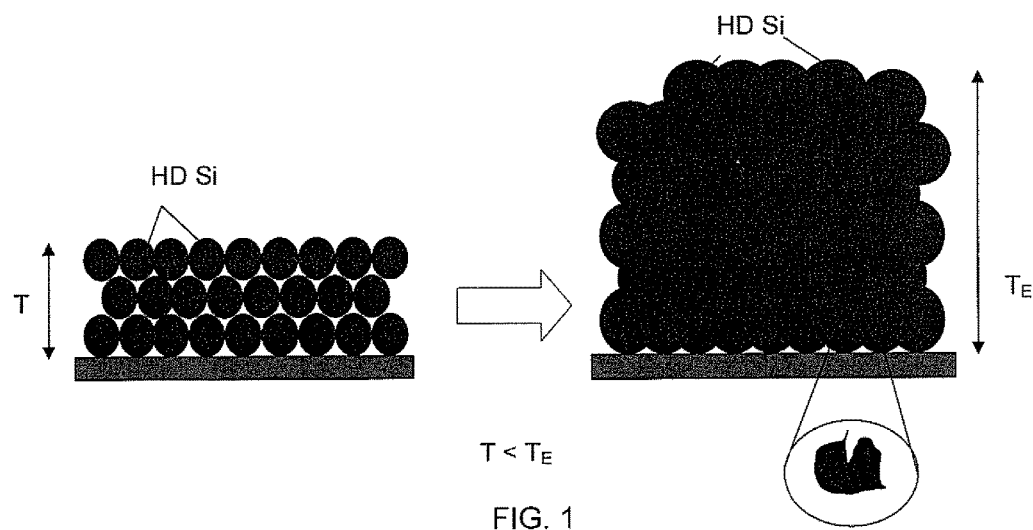
FIG. 1 is a schematic of high density silicon expansion in an anode of a lithium-ion battery.

FIG. 1 illustrates the volume expansion of conventional high-density silicon HD Si. The high density silicon HD Si has a high packing efficiency, low inter-particle porosity and high active material loading. Prior to use, the anode active material formed of high density silicon HD Si has a thickness T. However, once in use and lithiated, the high density silicon HD Si increases dramatically in volume, about 300% or greater than its initial volume, due to expansion of silicon upon lithium insertion. Because of the high packing efficiency, low inter-particle porosity and high loading, there is little to no available volume into which the high density silicon HD Si can expand. As the high density silicon HD Si particles expand, the thickness T of the anode active material increases to an expansion thickness $T_E$ ($T<T_E$). An increase in thickness of an electrode of 300% or greater is not acceptable in battery operation. The high density silicon HD Si particles also exert pressure due to expansion on neighboring particles, resulting in particle cracking and other damage, illustrated by the enlarged HD Si particle. Therefore, high density silicon is not a viable alternative to carbon as an anode active material for a lithium-ion battery even though silicon has an excellent theoretical lithium storage capacity.

Figure 2:
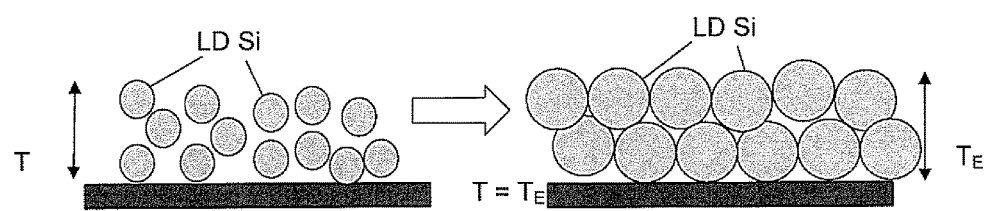
FIG. 2 is a schematic of low density silicon expansion in an anode of a lithium-ion battery.

Disclosed herein is an anode active material for use in a lithium-ion battery that has an excellent theoretical lithium storage capacity compared to conventional anode active material while being dimensionally stable and having excellent cycle life. The anode active material disclosed herein for use in an anode electrode of a lithium-ion battery is low density silicon. FIG. 2 illustrates the difference between the high density silicon HD Si and the low density silicon LD Si with regard to volume expansion. The low density silicon LD Si has a low packing efficiency, high inter-particle porosity and low active material loading. Prior to use, the anode active material layer with the low density silicon LD Si has a thickness T. While in use, the low density silicon LD Si particles expand similar to the high density silicon HD Si particles. However, there is available volume in the anode active layer due to the low packing efficiency and high inter-particle porosity, and the low density silicon LD Si particles expand into this available volume. The expansion thickness $T_E$ of the anode active material layer in a lithiated state during use will vary depending on the loading, porosity and density of the low density silicon LD Si particles, and can be as little as 200% or less of its pre-lithiated thickness T, 100% or less of its pre-lithiated thickness T or substantially equal to its pre-lithiated thickness T. Neighboring particles are not damaged due to the expansion. Rather, the expansion is accommodated by the available free volume inside the electrode structure. By controlling the density of the silicon particles used as the active anode material, the problems associated with the expansion of the high density silicon can be eliminated. Even though the active material loading of the low density silicon is lower than the loading of the high density silicon, resulting in a drop in absolute lithium storage capacity (mAh), the specific capacity of the low density silicon (3500 mAh/g) remains significantly higher than that of conventional graphite at 372 mAh/g.

The low bulk density of the silicon is achieved with amorphous silicon. Inter-particle porosity is a result of the low packing efficiency of the amorphous silicon. Both crystalline silicon and amorphous silicon have similar skeletal densities. However, the bulk density of amorphous silicon is an order of magnitude lower than that of crystalline silicon. Crystalline high density silicon has a bulk density of about 0.318 g/cm$^3$, while amorphous low density silicon has a bulk density of ranging between about 0.06 and 0.10 g/cm$^3$. Porosity of the amorphous silicon can be between about 60% and 80%, and more particularly, between about 60% and 75%. Both the porosity and the bulk density significantly affect the electrode morphology and packing efficiency. As shown in the table in FIG. 5, an unpressed anode prepared with the anode active material disclosed herein will have a porosity greater than 75% and a material density of about 0.5 g/cm$^3$.

Figure 3:
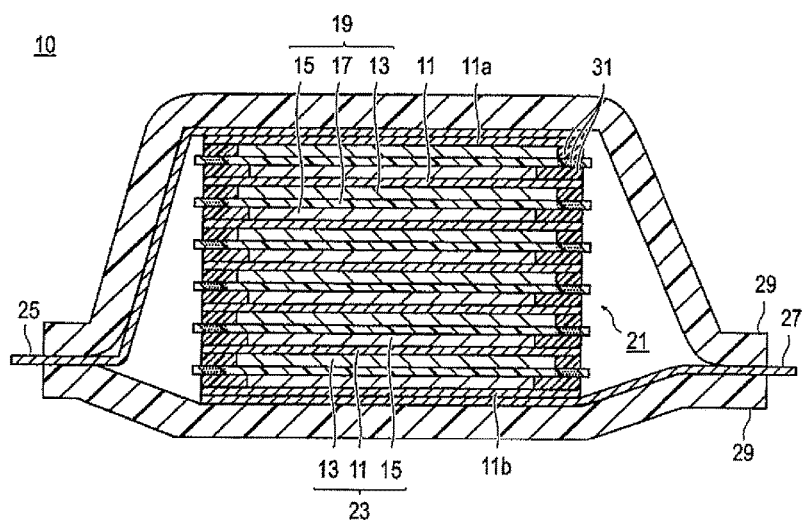
FIG. 3 is a schematic of a lithium-ion battery having the anode active material disclosed herein.

FIG. 3 is a schematic cross-sectional view showing the structure of a lithium-ion battery 10 incorporating the anode active material disclosed herein. The power generating element 21 of the lithium-ion battery 10 includes a plurality of unit cell layers 19 each including a layer of cathode active material 13, an electrolyte layer 17 and a layer of the anode active material 15. The cathode active material layer 13 is formed on one surface of a current collector 11 and electrically connected thereto and the anode active material layer 15 is formed on the other surface of the current collector 11 and electrically connected thereto. Each of the electrolyte layers 17 includes a separator 31 serving as a substrate and an electrolyte supported by the separator.

Examples of the cathode active material layer 13 may include lithium-transition metal composite oxides such as $LiMn_2O_4$, $LiCoO_2$, $LiNiO_2$, $Li(Ni-Co-Mn)O_2$, lithium-transition metal phosphate compounds, and lithium-transition metal sulfate compounds. These are provided by means of example and are not meant to be limiting. As the electrolyte constituting the electrolyte layer 17, a liquid electrolyte, a gel electrolyte or a polymer electrolyte known to those skilled in the art may be used. As examples, the liquid electrolyte may be in the form of a solution in which a lithium salt is dissolved in an organic solvent. The gel electrolyte may be in the form of a gel in which the above mentioned liquid electrolyte is impregnated into a matrix polymer composed of an ion conductive polymer. When the electrolyte layers are formed by a liquid electrolyte or gel electrolyte, a separator may be used in the electrolyte layer. Examples of the separators are porous films of polyolefin such as polyethylene and polypropylene. The current collector 11 is composed of a conductive material serving as a joining member for electrically connecting the active material layers 13, 15 to the outside.

Figure 4:
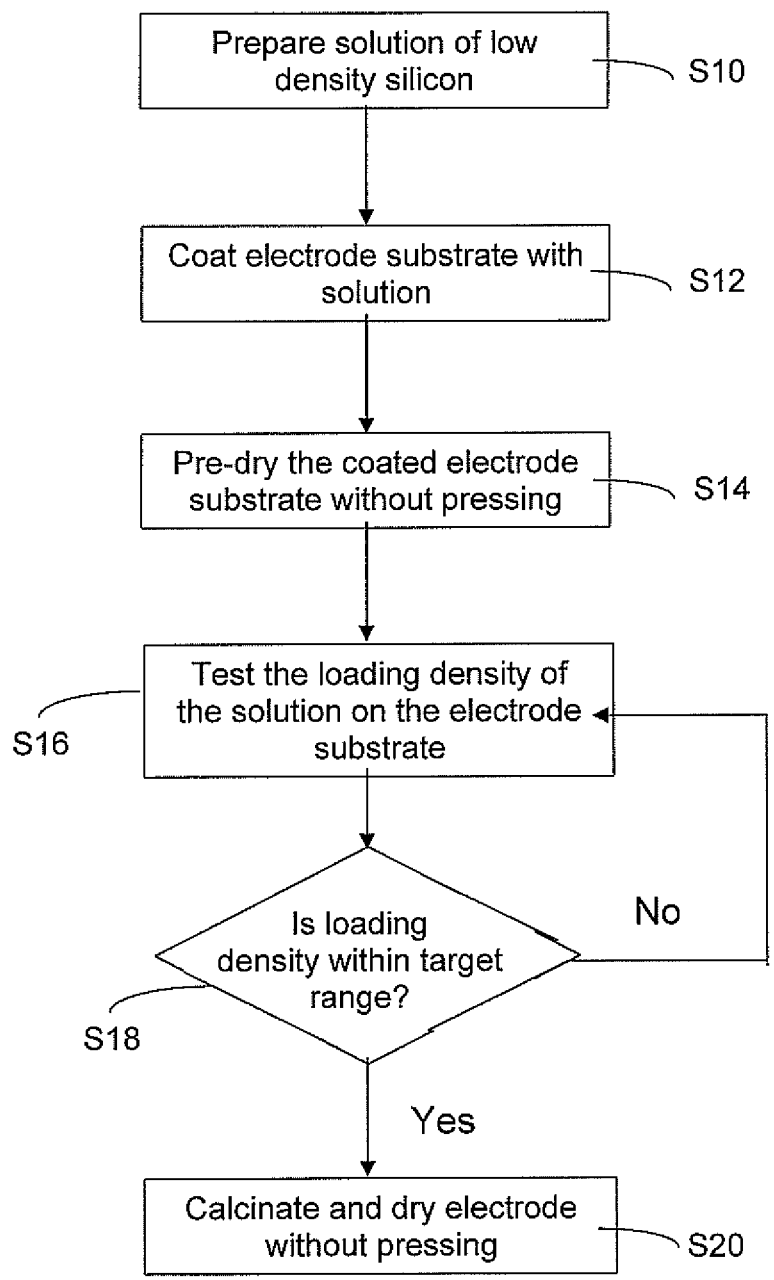
FIG. 4 is a flow diagram of a method of preparing the anode active material disclosed herein.

FIG. 4 is a flow diagram of a method of making the anode active material disclosed herein. In step S10, a solution is prepared of low density silicon, a conductive material and a binder. As a non-limiting example, the low density silicon can be at 80 weight % of the solution, with the conductive material being about 5 weight percent and the binder being about 15 weight %. The binder can be of any material known to those skilled in the art, such as polyimide. The conductive material can be, as a non-limiting example, carbon black that is added to enhance the electronic conductivity of the material. The solution can be prepared by mixing the solution. As a non-limiting example, the solution can be mixed at about 2000 rpm for between 3 and 5 minutes.

In step S12, an electrode substrate is coated with the solution to form the anode active material layer. Coating can be accomplished by rolling, spraying or any other method known to those skilled in the art of electrode fabrication.

Figures 5, 6:
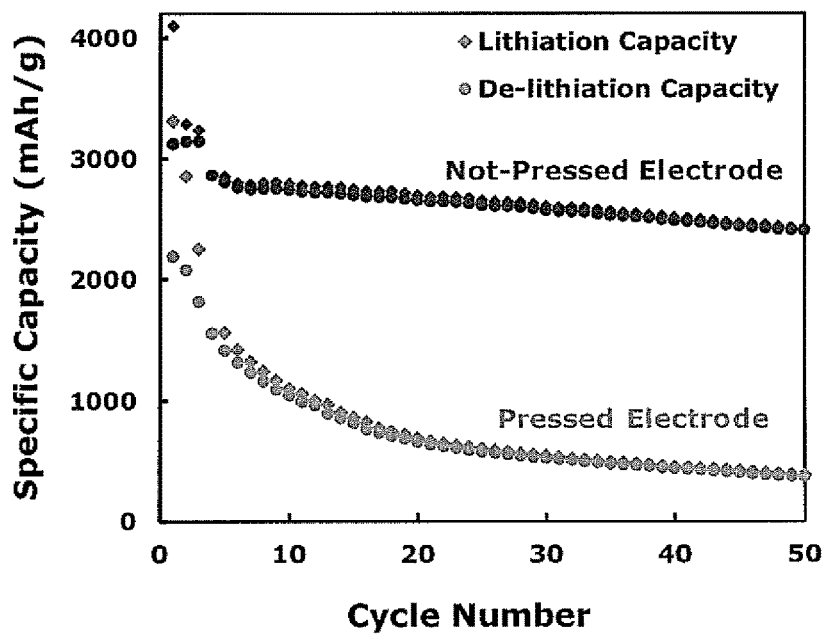
FIG. 5 is a table comparing a high density silicon electrode, a pressed low density silicon electrode and an unpressed low density silicon electrode.
FIG. 6 is a graph illustrating the superior specific capacity of an unpressed low density silicon electrode through 50 cycles of operation.

In step S14, the anode active material layer is pre-dried without pressing the anode active material layer to preserve inter-particle porosity. Typical electrode fabrication includes a pressing step to form the active material layer. However, pressing the anode active material disclosed herein can reduce or eliminate the inter-particle porosity that allows the low density silicon to expand without increasing the thickness of the layer. The table in FIG. 5 illustrates the difference between a low density silicon anode that has been pressed and one that has not been pressed. Pressing reduces the initial thickness of the electrode, but also removes greater than ten percent of its porosity, leaving 10% less inter-particle space to accommodate expansion upon use.

Active material loading of the coated electrode is tested in step S16 to determine if the loading of the low density silicon solution is within a target loading range. The target loading range can be, for example, 2 to 3 mg/cm$^2$. In step S18, a determination is made as to whether the loading is within the target loading range. If it is within the target loading range, than the anode is calcinated and dried in step S20, again without pressing. If the loading is not within the target loading range, than the loading of the solution on the electrode substrate is adjusted in step S22 and the process returns to step S16.

FIG. 6 is a graph further illustrating the importance of refraining from pressing during the preparation of the electrode using the anode active material disclosed herein. As shown in FIG. 6, when the electrode material is pressed with the substrate during manufacture of the electrode, the specific capacity of the electrode during cycling falls almost immediately to nearly half the specific capacity of the unpressed electrode and continues to gradually decrease. The unpressed electrode having the anode active material disclosed herein has a lithiation capacity of about 2837 mAh/g after one cycle and nearly maintains the lithiation capacity through 50 cycles. The lithiation capacity at 50 cycles is about 2364 mAh/g. The de-lithiation capacity shows similar results, with a de-lithiation capacity of about 2793 mAh/g after one cycle and 2383 mAh/g after 50 cycles. The coulombic efficiency throughout the 50 cycles remains at or about 100%.

As described herein, the processes include a series of steps. Unless otherwise indicated, the steps described may be processed in different orders, including in parallel. Moreover, steps other than those described may be included in certain implementations, or described steps may be omitted or combined, and not depart from the teachings herein.

All combinations of the embodiments are specifically embraced by the present invention and are disclosed herein just as if each and every combination was individually and explicitly disclosed, to the extent that such combinations embrace operable processes and/or devices/systems. In addition, all sub-combinations listed in the embodiments describing such variables are also specifically embraced by the present device and methods and are disclosed herein just as if each and every such sub-combination was individually and explicitly disclosed herein.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An anode for a lithium-ion battery comprising a substrate and an anode active material, wherein the anode active material comprises amorphous silicon, in an unpressed state, having a bulk density of between 0.06 g/cm$^3$ and 0.10 g/cm$^3$, wherein the amorphous silicon has an inter-particle porosity of between 60% and 80%.

2. The anode of claim 1 having an active material loading on the substrate of less than or equal to 3.0 mg/cm$^2$.

3. The anode of claim 1, wherein a thickness of the anode active material in a fully-lithiated state has an expanded thickness of less than 200% of a thickness of the anode active material in a pre-lithiated state.

4. The anode of claim 1, wherein a thickness of the anode active material in a fully-lithiated state has an expanded thickness of less than 100% of a thickness of the anode active material in a pre-lithiated state.

5. The anode of claim 1, wherein a thickness of the anode active material in a fully-lithiated state has a thickness that is substantially equal to a thickness of the anode active material in a pre-lithiated state.

6. A lithium-ion battery having a plurality of unit cells, each unit cell comprising:
    an anode comprising an anode active material of amorphous silicon, in an unpressed state, having a bulk density of between 0.06 g/cm$^3$ and 0.10 g/cm$^3$, wherein the amorphous silicon has an inter-particle porosity of between 60% and 80%;
    a cathode comprising a cathode active material comprising lithium; and
    an electrolyte there between.

7. The lithium-ion battery of claim 6, wherein a thickness of the anode active material in a fully-lithiated state has an expanded thickness of less than 100% of a thickness of the anode active material in a pre-lithiated state.

8. The lithium-ion battery of claim 6, wherein a thickness of the anode active material in a fully-lithiated state has a thickness that is substantially equal to a thickness of the anode active material in a pre-lithiated state.

9. A method of preparing an anode for a lithium-ion battery comprising: preparing a solution of low density silicon defined as amorphous silicon having a bulk density of between 0.06 g/cm$^3$ and 0.10 g/cm$^3$ and an inter-particle porosity of between 60% and 80%, a conductive material and a binder; coating an electrode substrate with the solution to form the anode; pre-drying the anode without pressing the anode to preserve the inter-particle porosity; testing an active material loading of the low density silicon in the anode; if the active material loading is within a target loading range, then calcinating and drying the anode without pressing the anode; and if the active material loading is not within the target loading range, then adjusting the active material loading of the solution on the electrode substrate and re-testing.

10. The method of claim 9, wherein the target loading density range is 2 to 3 mg/cm$^2$.

11. The method of claim 9, wherein the solution is prepared with between 70 and 90 weight percent low density silicon.

* * * * *